3,228,836
ALDEHYDE COMPLEXES OF COLISTIN AND
POLYMYXIN ANTIBIOTICS
Joachim Anschel and Fred C. Ninger, Livingston, N.J., assignors to Warner-Lambert Pharmaceutical Company, Morris Plains, N.J., a corporation of Delaware
No Drawing. Filed Oct. 9, 1962, Ser. No. 229,488
12 Claims. (Cl. 167—65)

This invention relates to novel aldehyde complexes of basic polypeptide antibiotics useful in repository pharmaceutical dosage forms, and to a new and novel process for the synthesis of these polypeptide antibiotic aldehyde complexes.

Certain polypeptide antibiotics and their acid addition salts such as colistin sulfate or salts of a polymyxin such as polymyxin B sulfate, for example, have been widely used against a variety of bacterial infections. These antibiotics are particularly effective against gram-negative bacilli such as Salmonella, Pseudomonas, Escherichia and Klebsiella species. As is known, these gram-negative bacilli can cause both local and generalized or systemic infections. Thus, for example, the pathogenic Salmonella species can spread from the gastrointestinal tract, which is usually the primary site of infection, to cause a Salmonella septicemia from which death will ultimately ensue if the infection is untreated. The Pseudomonas and Escherichia species of microorganism, for example, are common causative agents of urinary tract infections. These gram-negative bacilli are known to have a tough capsule and they are also known to mutate rapidly which enables them to resist destruction. To treat one of these gram-negative bacterial infections successfully the agent of choice must not only be effective against these organisms but must also be able to be administered in and to sustain an effective therapeutic concentration in the body.

Although polypeptide antibiotics such as polymyxin B sulfate and colistin sulfate are very effective against these organisms, they are rapidly metabolized in the body so that repeated administration of the antibiotic is necessary in order to sustain a therapeutic concentration in the blood. The necessity for repeated injections has many disadvantages. For example, in order to maintain a constant therapeutic concentration in antibiotic therapy, the antibiotic of choice should be continually and gradually released to obtain a constant blood level rather than entering the blood stream at peak levels in one or more surges as is commonly the result of repeated administration of the antibiotic. Another important disadvantage is the undesirable toxic effects which may result from repeated administration of a therapeutic dose of a rapidly metabolized antibiotic, such as colistin sulfate. Furthermore, repeated injections to treat a chronic infection may become a problem due to resulting trauma produced by repeated insertion of a needle.

It is, therefore, an important object of this invention to provide a repository form of a polypeptide antibiotic which will sustain a therapeutic effect with respect to effective blood levels over a period of 12 hours following a single administration of a therapeutic dose of the polypeptide antibiotics. A further object of this invention is to provide a suitable repository form of a polypeptide antibiotic which because of its slow release in the body fluids will result in a decrease of toxicity. Other objects of this invention will appear from the following detailed description.

As is known, there are many methods by which the effect of an active drug can be sustained. For example, a reduction in the solubility of the drug may produce a significantly more prolonged action. This is the experience when penicillin G is converted from the more soluble potassium penicillin G to the benzathine salt and also when sulfisoxazole itself is converted to the acetyl form. Although many insoluble complexes can be prepared in order to prolong absorption time, it is quite important that there should not be a decrease in the efficiency of absorption.

It has now been found that the salts of polypeptide antibiotics such as colistin sulfate in an alkali pH will react with aldehydes such as, for example, salicylaldehyde, formaldehyde, furfurylaldehyde and vinylaldehyde to yield aldehyde-antibiotic complexes which resemble a Schiff base and which are very sparingly soluble in water. The complexes, for example, are prepared by adjusting an aqueous solution of a salt of the basic polypeptide to a pH of 7-8 and adding to the solution the desired aldehyde. The resulting complexes precipitate out of solution and may be removed by filtration. These aldehyde complexes may be represented by the formula $$R(A)_n$$

where R is a basic polypeptide antibiotic, $n$ is an integer from 1 to 6 and A is a member of the group consisting of lower saturated aliphatic aldehydes, lower unsaturated aliphatic aldehydes, aromatic aldehydes and heterocyclic aldehydes. The complexes formed by this reaction such as the colistin-salicylaldehyde complex are less soluble in water than their parent acid salts and hence they are slowly absorbed to give a desirable as well as a sustained therapeutic concentration in the blood stream. Thus, for example, when a 0.26% aqueous suspension of a colistin-salicylaldehyde complex is injected subcutaneously into mice at an equivalent dose of 30 mg. of colistin base per kg. of body weight and 32 hours later the mice are challenged with a 100% lethal dose of *Klebsiella pneumoniae*, the residual antibiotic activity remaining in the blood due to the slow release of the complex protects the mice from any infection. Mice receiving the equivalent dose of colistin as sodium colistin methane sulfonate salt show no antibacterial protective activity on being challenged with *K. pneumonia* 32 hours after the sodium colistin methane sulfonate has been administered.

The aldehyde complexes can be administered in pharmaceutically acceptable injection forms such as a suspension in water or inert oil.

In order further to illustrate our invention but without being limited thereto the following examples are given.

*Example 1*

To an aqueous solution containing 10 parts by weight of colistin sulfate is added a sufficient amount of sodium bicarbonate to obtain a pH of 7.2 and five parts by weight of salicylaldehyde is added to the solution and allowed to react for one hour at 25° to 27° C. The reaction product forms as a yellow precipitate of a colistin-salicylaldehyde complex and is removed from the solution by filtration. The crude complex is washed with ether and dried at 25° to 27° C. The dried colistin sulfate-salicylaldehyde complex has a melting point of 215° to 220° C.

*Example 2*

To 10 parts by weight of sodium colistin methane sulfonate dissolved in distilled water is added five parts by weight of salicylaldehyde, the mixture agitated for one hour at 25° to 27° C. and then allowed to react for 16 to 18 hours. The resulting sodium colistin methane sulfonate salicylaldehyde complex precipitates out of the solution as a yellow residue. After removal from the solution by filtration, the precipitate is washed with ether and dried at 25° to 27° C.

Example 3

10 parts by weight of polymyxin B sulfate is dissolved in 100 parts of water and sufficient sodium bicarbonate is added to adjust the pH to 7.2. Five parts by weight of salicylaldehyde are then added and the resulting suspension is allowed to react for one hour at 25° to 27° C. The polymyxin B-salicylaldehyde complex which forms precipitates out of the solution and, after removal by filtration, is air-dried. The product is then washed with ether and again air-dried at 25° to 27° C.

Example 4

10 parts by weight of colistin sulfate is dissolved in 100 parts by weight of water and sufficient sodium bicarbonate is added to adjust the solution to a pH of 7.4. To 20 ml. of this solution is added one gram of D-L glyceraldehyde and the resulting mixture is agitated for one hour and then allowed to stand at 25° to 27° C. for 16 to 18 hours. The colistin glyceraldehyde which precipitates as dark brown crystals is collected on a filter, washed with water and air-dried.

Example 5

10 parts by weight of colistin sulfate is dissolved in 100 parts by weight of water and sufficient sodium bicarbonate is added to adjust the solution to a pH of 7.4. To 20 ml. of this solution is added one gram of nicotin-aldehyde and the resulting mixture is then agitated for one hour and it is allowed to stand at 25° to 27° C. for 16 to 18 hours. The colistin nicotin-aldehyde complex which precipitates out as light yellow crystals is collected on a filter, washed with water and air-dried.

Example 6

10 parts by weight of colistin sulfate is dissolved in 100 parts by weight of water and sufficient sodium bicarbonate is added to adjust the solution to a pH of 7.4. To 20 ml. of this solution is added one gram of succinaldehyde and the resulting mixture is then agitated for one hour and allowed to stand at 25° to 27° C. for 16 to 18 hours. The colistin succinaldehyde complex which precipitates out as a tan amorphous powder is collected on a filter, washed with water and air-dried.

Example 7

10 parts by weight of colistin sulfate is dissolved in 100 parts by weight of water and sufficient sodium bicarbonate is added to adjust the solution to a pH of 7.4. To 20 ml. of this solution is added one gram of lauric aldehyde and the resulting mixture is then agitated for one hour and allowed to stand at 25° to 27° C. for 16 to 18 hours. The colistin lauric aldehyde complex precipitates out as a yellow oily liquid and is separated from the aqueous layer, washed with water and air-dried.

Example 8

10 parts by weight of colistin sulfate is dissolved in 100 parts by weight of water and sufficient sodium bicarbonate is added to adjust the solution to a pH of 7.4. To 20 ml. of this solution is added one gram of pyruvic aldehyde and the resulting mixture is then agitated for one hour and allowed to stand at 25° to 27° C. for 16 to 18 hours. The colistin pyruvic aldehyde complex precipitates as dark brown crystals and is collected on a filter, washed with water and air-dried.

Example 9

20 parts by weight of sterile colistin salicylaldehyde complex in powder form are suspended in about 80 parts by weight of a sterile, pyrogen free, 1% aqueous solution of carboxymethyl-cellulose. The mixture is stirred until a uniform suspension results. The suspension obtained is suitable for parenteral administration.

It is understood that the foregoing detailed description is given merely by way of illustration and that many variations may be made therein without departing from the spirit of our invention.

Having described our invention, what we desire to secure by Letters Patent is:

1. An aldehyde-polypeptide antibiotic complex of the formula $$R(A)_n$$

where R is a basic polypeptide antibiotic selected from the group consisting of colistin and polymyxin, $n$ is an integer from 1 to 6 and A is a member of the group consisting of salicylaldehyde, D-L glyceraldehyde, nicotinaldehyde, succinaldehyde, lauric aldehyde and pyruvic aldehyde, said antibiotic complex being prepared by contacting said basic polypeptide antibiotic with said aldehyde in an alkaline medium.

2. A colistin salicylaldehyde complex prepared by contacting a solution of colistin with salicylaldehyde in an alkaline media.

3. A colistin D-L glyceraldehyde complex prepared by contacting a solution of colistin with D-L glyceraldehyde in an alkaline media.

4. A colistin nicotin-aldehyde complex prepared by contacting a solution of colistin with nicotin-aldehyde in an alkaline media.

5. A colistin succinaldehyde complex prepared by contacting a solution of colistin with succinaldehyde in an alkaline media.

6. A colistin lauric aldehyde complex prepared by contacting a solution of colistin with lauric aldehyde in an alkaline media.

7. A colistin pyruvic aldehyde complex prepared by contacting a solution of colistin with pyruvic aldehyde in an alkaline media.

8. A polymyxin B salicylaldehyde complex prepared by contacting a solution of polymyxin B with salicylaldehyde in an alkaline media.

9. A process for the production of an aldehyde-polypeptide antibiotic complex, as defined in claim 1, which comprises adjusting an aqueous solution of a salt of a basic polypeptide antibiotic selected from the group consisting of colistin and polymyxin to an alkaline pH, adding to said aqueous solution an aldehyde selected from the group consisting of salicylaldehyde, D-L glyceraldehyde, nicotin-aldehyde, succinaldehyde, lauric aldehyde and pyruvic aldehyde, and allowing the polypeptide antibiotic aldehyde complex formed to precipitate.

10. A process as defined in claim 9 wherein said polypeptide antibiotic salt is colistin sulfate.

11. A process as defined in claim 9 wherein said polypeptide antibiotic salt is sodium colistin methane sulfonate.

12. A process as defined in claim 9 wherein said polypeptide antibiotic salt is polymyxin B sulfate.

References Cited by the Examiner

Jour. of Medicinal and Pharmaceutical Chemistry, vol. 1, No. 5 (1959) pages 467, 484–500.

JULIAN S. LEVITT, *Primary Examiner.*

SAM ROSEN, *Assistant Examiner.*